United States Patent [19]

Arrington et al.

[11] Patent Number: 4,746,189
[45] Date of Patent: May 24, 1988

[54] OPTICAL FIBER ADHESIVE JOINT TUBE

[75] Inventors: John P. Arrington, San Mateo; Nelson M. Shen, San Jose; Wendell W. Moyer, Atherton; David R. Myers, Mountain View; David E. James, Pasadena, all of Calif.

[73] Assignee: Raychem Corporation, Menlo Park, Calif.

[21] Appl. No.: 787,951

[22] Filed: Oct. 16, 1985

Related U.S. Application Data

[63] Continuation-in-part of Ser. No. 464,805, Feb. 8, 1983, abandoned, and a continuation-in-part of Ser. No. 465,362, Feb. 10, 1983, abandoned.

[51] Int. Cl.$^4$ .............................................. G02B 6/38
[52] U.S. Cl. .................. 350/96.21; 350/96.34
[58] Field of Search .................. 156/158, 159, 84–86, 156/166, 232, 244.13, 272.2, 273.5, 275.5, 275.7, 289, 296, 307.1; 428/36, 40, 352; 138/145–146, DIG. 3; 206/813; 350/96.20, 96.21, 96.22, 96.23, 96.34

[56] References Cited

U.S. PATENT DOCUMENTS

| | | | |
|---|---|---|---|
| 3,734,594 | 5/1973 | Trambarulo | 350/96.21 |
| 3,870,395 | 3/1975 | Schicketanz | 350/96.21 |
| 4,057,448 | 11/1977 | Miller | 350/96.21 |
| 4,102,717 | 7/1978 | Hensel | 156/64 |
| 4,124,364 | 11/1978 | Dalgoutee | 350/96.21 |
| 4,153,331 | 5/1979 | Cross | 350/96.20 |
| 4,196,965 | 4/1980 | Matsuno | 350/96.21 |
| 4,211,591 | 7/1980 | Stiles | 156/86 |
| 4,213,672 | 7/1980 | Aulich et al. | 350/96.23 |
| 4,378,954 | 4/1983 | Baker | 350/96.20 |
| 4,487,475 | 12/1984 | Ogawa | 350/96.21 |
| 4,561,719 | 12/1985 | Quan | 350/96.21 |

FOREIGN PATENT DOCUMENTS

| | | |
|---|---|---|
| 0001278 | 4/1979 | European Pat. Off. . |
| 54-107352 | 8/1979 | Japan . |
| 56-25708 | 3/1981 | Japan . |
| 57-115512 | 7/1982 | Japan .................. 350/96.20 |
| 7811931 | 6/1979 | Netherlands . |
| 1433755 | 4/1976 | United Kingdom . |
| 1447469 | 8/1976 | United Kingdom . |
| 1448741 | 9/1976 | United Kingdom . |
| 1498600 | 1/1978 | United Kingdom . |
| 1507210 | 4/1978 | United Kingdom . |
| 1524751 | 9/1978 | United Kingdom . |
| 2003294 | 3/1979 | United Kingdom . |
| 2039379 | 8/1980 | United Kingdom . |
| 1588227 | 4/1981 | United Kingdom . |
| 2100463 | 12/1982 | United Kingdom . |
| 2130741 | 6/1984 | United Kingdom . |

OTHER PUBLICATIONS

Schlanger et al., Modern Plastics Encyclopedia, 1977-78, "Fluoroplastics", pp. 26–30.

*Primary Examiner*—Willam L. Sikes
*Assistant Examiner*—Frank González
*Attorney, Agent, or Firm*—Dennis E. Kovach; Herbert G. Burkard

[57] ABSTRACT

An article suitable for use in the adhesive joining of two optical fibers with low light loss comprises a tubular container an inner surface of which is coated with a release agent and/or is composed of an inherently releasing material, which is larger in cross-section at the ends than at a central region, the smaller central region being where the ends of the fibers are joined.

26 Claims, 1 Drawing Sheet

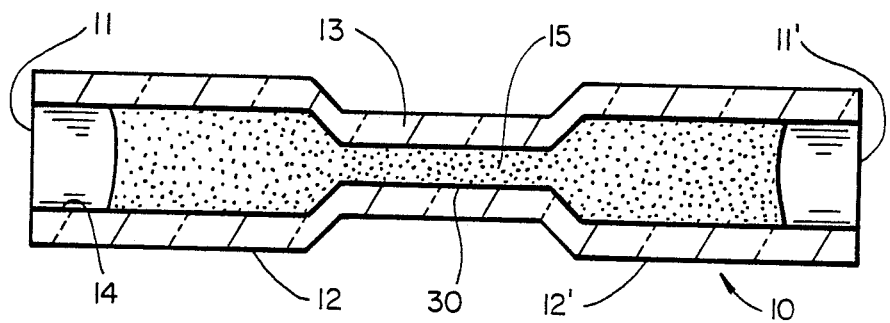
FIG_1
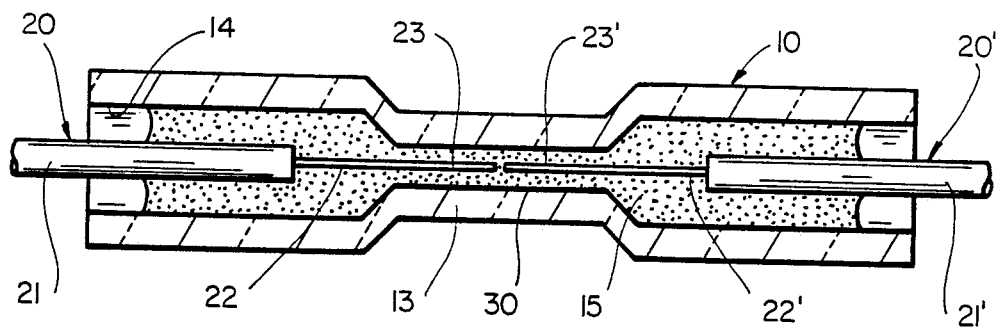
FIG_2

OPTICAL FIBER ADHESIVE JOINT TUBE

CROSS REFERENCE TO RELATED APPLICATIONS

The present invention is a continuation-in-part of U.S. Ser. Nos. 464,805 and 465,362, filed Feb. 8, 1983 and Feb. 10, 1983, both abandoned, the disclosures of which are incorporated herein by reference.

BACKGROUND OF THE INVENTION

This invention relates to the adhesive joining of optical fibers, and especially to the adhesive joining of optical fibers which have been optically aligned.

In commonly assigned U.S. patent application No. 258,079, filed Apr. 27, 1981, now abandoned, continuation-in-part 370,321 now abandoned filed Apr. 21, 1982, and continuation-in-part 437,053 filed Oct. 27, 1982, the disclosures of which are incorporated herein by reference, there is disclosed a technique for the adhesive joining of optical fibers. The fibers are butted end-to-end within a tube containing index-matching adhesive, optically aligned by measuring the light intensity passing from one fiber to the other and maximizing that intensity, and the adhesive is then caused to harden. A preferred adhesive is a photopolymerizable adhesive, i.e. one that will harden on exposure to ultraviolet light.

It has been discovered, however, that shrinkage and flow of the adhesive as it sets tend to cause a loss of orientation of the fiber ends with respect to each other, which may result in an unacceptably high loss at the joint.

This adverse effect is a consequence of the adhesive being in a tube: polymerization of a drop of adhesive between two fiber ends but otherwise unconstrained does not cause a problem. However, in a tube, the surface interface between the adhesive and the tube inner wall restricts the freedom of the adhesive to shrink without coming under stress. Eventually the stress is relieved by cracking or void formation in the adhesive, flow of the adhesive, or separation at an adhesive surface.

Because the fibers are flexible, it is not believed possible to rely on simply holding the fibers to prevent their movement: although the parts which are held remain still, the forces exerted on the ends by the shrinking adhesive are quite sufficient to cause relative movement.

It has been proposed in British Published Patent Application No. 2,039,379A, the disclosure of which is incorporated herein by reference, to cure a photopolymerizable adhesive about an optical fiber which is to be aligned with a lens. This curing comprises first curing the adhesive adjacent the lens and the end of the fiber, and then curing the remaining adhesive by gradually exposing it to light. The technique proposed in that application relies on the ability to symmetrically cure the adhesive about the fiber end to avoid loss of alignment.

U.S. Pat. No. 4,201,618 (Lewis) disclosures an apparatus designed to achieve the symmetric curing of a photopolymerizable adhesive used to join the ends of optical fibers. The adhesive is contemplated as being unconstrained (not in a tube), and a uniformly stressed bonded connection is said to be formed.

SUMMARY OF THE INVENTION

We have discovered that if the cross-section of a tubular container used for forming an adhesive joint between aligned optical fibers is larger at the ends than at a central region, and the adhesive joint is formed between the ends of the fibers in the smaller central region, an improved joint results.

We have further discovered that if the tubular container used for forming an adhesive joint between aligned optical fibers has at least an inner surface which is coated with a release agent and/or is composed of an inherently releasing material, an improved joint also results.

BRIEF DESCRIPTION OF THE DRAWING

FIG. 1 shows in longitudinal cross-section a container according to this invention; and FIG. 2 shows, also in longitudinal cross-section, the container of FIG. 1 in use to make a joint between optical fibers.

DESCRIPTION OF THE PREFERRED EMBODIMENTS

In a first aspect, this invention provides a tubular container suitable for use in joining the ends of two optical fibers which comprises a generally tubular straight container which has two open ends, whose smallest internal cross-sectional dimension is at least 150 microns, and whose internal cross-section is greater at the ends than in a central region between the ends.

In a second aspect, this invention provides a method of adhesively joining two optical fibers; which comprises optically aligning the ends of the fibers within the central region of an adhesive-filled container of the type described above and causing the adhesive to harden. The fibers are preferably aligned close to, but not touching, the inner surface of the central region.

The alignment technique employed may be, for example, optical alignment, by which is meant the use of the technique disclosed in above-cited U.S. patent application No. 370,321; or visual alignment, where the positions of the fiber ends are observed with a microscope and moved into axially aligned, abutting relationship.

The preferred technique for joining the aligned fibers is by supplying a hardenable, fluid, index-matching adhesive to the ends of the aligned fibers. Preferably the adhesive is polymerizable (this term being used to include adhesives which can be further polymerized or cross-linked). The adhesive may be self-setting (e.g. a two-component epoxy or cyanoacrylate adhesive) but is preferably one which polymerizes only when exposed to selected treatment after the fibers have been aligned. Particularly useful are photopolymerizable adhesives which can be cured by exposure to UV light, for example a photo-initiated urethane/acrylate adhesive. Other hardenable adhesives can be used, however. The hardened adhesive will be transparent to radiation of at least one of the wavelengths used as a signal in optical fibers (typically 810–860, 1280–1320 and 1450–1550 nanometers).

Where the fibers to be joined comprise both a core and a cladding up to their ends which are to be joined, the hardened adhesive will usually have a refractive index which is not substantially less than that of the core, i.e. at least 1.4, preferably at least 1.45. However, where plastic-clad fibers are to be joined and the optical cladding is stripped back from the ends, the refractive index of the adhesive will preferably be identical or very close to that of the cladding.

The container is preferably a tube having an annular cross-section (a cross-section which is circular), but it can also be a tube having a different closed cross-section, or an open trough or another form of container which will contain and retain the adhesive; all such containers are included by the term "generally tubular container" as used herein. If the container is stored with the adhesive therein, it can if desired be fitted with removable end caps which seal its open ends thus keeping the adhesive clean and, if necessary, preventing it from leaking out of the container. A feature of the container that we have discovered to be significant in joining optical fibers is that the container has a central region which is of smaller cross-section than the cross-section at the end regions.

This smaller central cross-section offers two particular advantages. First, it reduces the volume of adhesive which is hardened near the fiber ends, thereby lessening the movement caused by polymer shrinkage and flow. Second, when the fibers are stripped of their buffers or claddings for a part of their length, it is desirable that the buffer extend into the adhesive to obtain a joint of maximum tensile strength between the fibers. However, it is also desirable that the fiber ends lie close to, but not touching, for example, 10 to 50 microns from, the inner surface of the container near the means for causing the adhesive to harden, to ensure that the adhesive hardens near the fiber ends first, locking them into alignment before the rest of the adhesive hardens. A container having a smaller central cross-section accommodates these apparently conflicting requirements.

The container should be such as to allow adequate movement of the fibers during the alignment process and is preferably at least 1.2 times, e.g. 1.6 times, especially 3 times the external diameter of the fiber. Thus, for example, fibers having a 125 micron outer diameter (core plus cladding) and a 250 micron diameter buffer may conveniently be joined within a container having an internal diameter of 500 microns in the central region and 1000 microns at the ends. The internal cross-section of the central region is preferably 250 to 750 microns, especially about 400 to 600 microns. The internal cross-section of the ends is preferably from 1.5 to 10 times the internal cross-section of the central region, e.g. 500 to 3000 microns, preferably 750 to 2000 microns.

The length of the smaller central region should be sufficient to enable joining of the fiber ends, e.g. at least 1 mm, but is preferably less than about 5 mm, especially in the case of a container for joining stripped fibers. The length of the container overall should be sufficient to allow a strong adhesive joint to be formed, for example at least 5 mm, and is preferably less than about 25 mm, as an excessively long tube makes alignment of the fiber ends difficult. A preferred length range is 10 to 20 mm.

The container may be composed of, for example, quartz glass, metal, or a polymeric composition, provided that it permits (and is not damaged by) the desired process for hardening the adhesive. When the preferred photo-polymerizable adhesive is used, the container should be UV-transparent.

The inner surface of the container is preferably coated with a release agent, and/or the material of the surface is inherently releasing, as has been discussed previously.

By a release agent is meant an agent which lowers the adhesion between the surface on which it is coated and another material (in this case, the adhesive) with which that surface comes into contact, so that the other material may separate from the surface. Release agents are typically polymers of low surface energy, such as fluoropolymers or silicones, and can be solids or liquids (e.g. oils). They may be conveniently coated on a surface in liquid form (either, for example, as a solution in a solvent which later evaporates or as a curable release agent, which is coated in uncured form and then cured).

Exemplary release agents which have been found useful in this invention are fluoropolymer (e.g. PTFE) dispersions, curable silicones (e.g. polydimethyl siloxanes), and silicone oils (e.g. low molecular weight polydimethyl siloxanes) of moderate viscosity (e.g. 5000 to 12500 centipoise). Because it has been found for this purpose that curable silicones are not as effective release agents as oils, but oils tend to migrate and have short shelf lives, a particularly useful release agent is a mixture of a curable silicone with a silicone oil, in a ratio of from 10:90 to 90:10, preferably 30:70 to 40:60 parts by weight.

By an inherently releasing material is meant a material of low surface energy such that the adhesive bond strength of the bond between it and an adhesive is less than the cohesive bond strength of the adhesive.

Typical inherently releasing materials are polymers of low surface energy. Since it may be convenient to make the entire container from the inherently releasing material, fluoropolymers such as PTFE which are difficult to mold may be less suitable than materials such as, for example, poly(4-methyl pentene-1), which is a preferred material for manufacture of the entire container.

Since the adhesive is desirably chosen to have a greater adhesive bond strength to the fibers than cohesive bond strength, to prevent separation from the fibers, the provision of a release agent or an inherently releasing material will tend to ensure that the adhesive separates from the container wall on shrinkage, rather than forming voids or separating from the fibers.

The materials discussed above are particularly useful when photopolymerizable acrylate adhesives are used to join the fibers, but it will be a matter of routine experimentation for a person of ordinary skill in the art, having regard to this specification, to determine suitable release agents or inherently releasing materials for a particular adhesive.

The hardenable adhesive used preferably has a viscosity such that it is retained in the container at 23° C. with the container horizontal, and more preferably under all other conditions likely to be encountered before the adhesive is hardened. On the other hand, its viscosity should not be such that it is difficult to insert and move the optical fibers under the joining conditions. We prefer to use an adhesive having a viscosity of 750 to 3000 centipoise, particularly 1200 to 2500 centipoise, e.g. about centipoise, (viscosities referred to herein are measured at 23° C. using a Model HBT Brookfield Viscometer, Spindle No. SC4-27 rotating at 100 rpm).

The adhesive may alternatively be retained in, for example, a small polymeric bulb attached (or capable of attachment) to one of the ends of the container, and be dispensed into the container when the container is to be used. This offers particular advantage if a two-component adhesive is used, since a two-part bulb may be employed.

FIG. 1 illustrates in longitudinal cross-section an embodiment of a container according to this invention.

The container, shown generally at 10, has two open ends 11 and 11' and end regions 12 and 12' which have a greater internal cross-section than the central region 13. The inner surface 14 of the container may comprise a release agent 30 (shown) and/or the material comprising the container itself may be self-releasing. A quantity of index-matching adhesive 15 is shown within the container.

FIG. 2 illustrates the container of FIG. 1 is used to make an adhesive joint between two optical fibers. The buffers 21 and 21' of two optical fibers, shown generally at 20 and 20', have been cut back, exposing the glass fibers 22 and 22'. The fibers are inserted into the container so that the ends 23 and 23' of the fibers are almost abutting within the central region 13 of the container 10. The fibers are then aligned (by means not illustrated here), and the index-matching adhesive 15 is caused to harden to make the joint.

EXAMPLE 1

An apparatus generally as described in U.S. patent application No. 370,321 was used to join two identical optical fibers. The fibers (which are available from Corning Glass) consisted of a glass core of diameter 50 microns, a glass cladding of outside diameter 125 microns, and a polyacrylate buffer of outer diameter 250 microns. The buffer was stripped from the fiber ends and the stripped fiber ends cleaved to provide clean end surfaces about 3 mm from the end of the buffer. The fibers were then inserted into a tube shaped according to this invention. The tube, made of poly (methyl pentene) had an overall length of 12.7 mm, and a narrow central region length of 3.2 mm. The inner diameter of the end regions was 1500 microns and of the central region was 500 microns, with the wall thickness being 500 microns. The tube contained a UV-polymerizable adhesive having a refractive index (when cured) of about 1.49, which adhesive comprised a mixture of about 3 parts by weight of trimethylolpropane triacrylate and 1 part by weight of a urethane/acrylate oligomer (Uvethane 788 from Thiokol) with a small quantity of a photoinitiator. The adhesive had a viscosity (uncured) of about 2200 centipoise.

The fibers were inserted into the adhesive-filled tube so that the stripped ends almost touched at the center of the tube near the wall nearest a UV lamp, and were then precisely aligned. The adhesive was then cured in a two-stage zone cure; in which (1) a length of 1 mm about the ends of the fibers was exposed to the lamp, and (2) the rest of the tube was exposed.

An excellent splice could be reproducibly prepared with a loss less than 0.1 dB.

EXAMPLE 2

An apparatus generally as described in U.S. patent application No. 370,321 was used to join two identical optical fibers. The fibers (which are available from Corning Glass) consisted of a glass core of diameter 50 microns, a glass cladding of outside diameter 125 microns, and a polyacrylate buffer of outer diameter 250 microns. The buffer was stripped from the fiber ends and the stripped fiber ends cleaved to provide clean end surfaces about 3 mm from the end of the buffer. The fibers were then inserted into a tube coated according to this invention. The tube, which was a straight annulus of quartz, length 12.7 mm and internal diameter 1000 microns, was coated with a release agent comprising 50% by weight of a curable silicone (96% Sylgard 7044 resin, 4% Sylgard 7048 catalyst) with 50% by weight of a silicone oil of viscosity 5000 centipoise. The tube contained a UV-polymerizable adhesive having a refractive index (when cured) of about 1.49, which adhesive comprised a mixture of about 3 parts by weight of trimethylolpropane triacrylate and 1 part by weight of a urethane/acrylate oligomer (Uvethane 788 from Thiokol) with a small quantity of a photoinitiator. The adhesive had a viscosity (uncured) of about 2200 centipoise.

The fibers were inserted into the adhesive-filled tube so that the stripped ends almost touched near the center of the tube and were then precisely aligned. The adhesive was then cured in a two-stage zone cure in which (1) a length of 1 mm about the ends of the fibers was exposed to the lamp, and (2) the rest of the tube was exposed.

An excellent splice could be reproducibly prepared.

What is claimed is:

1. An article for joining ends of two optical fibers each including a core and a cladding, comprising:
    a generally tubular container having first and second opposite ends and a central region therebetween the central region having a cross-sectional area smaller than cross-sectional area of the opposite container ends, liquid curable adhesive being disposed within the central region,
    the central region cross-sectional area being substantially larger than a cross-sectinal area of the first and second ends of the first and second fibers to be joined so as to allow the first and second fiber ends to be moved within the adhesive and the container central region relative to one another in amounts sufficient such that cores of the first and second fibers can be optimally alligned when claddings of the fiber ends are misaligned, a diameter of the central region being more than 1.2 times as large as a cladding diameter of each of the first and second optical fiber ends so that cores of the fibers can be optimally aligned.

2. The article of claim 1, the container being substantially cylindrical in shape, the diameter of the central region being substantially smaller than a diameter of the opposite container ends.

3. The article of claim 1, the central region diameter being more than 1.6 times as large as the cladding diameter of each of the first and second fiber ends.

4. The article of claim 1, the central region diameter being more than three times as large as the cladding diameter of each of the first and second fiber ends.

5. The article of claim 1, a diameter of the opposite container ends each being more than 1.5 times as large as the central region diameter.

6. The article of claim 5, the diameter of the opposite container ends each being less than 10 times as large as the central region diameter.

7. The article of claim 6, the central region diameter being greater than 150 microns.

8. The article of claim 7, the central region diameter being between 250 and 750 microns.

9. The article of claim 7, the central region diameter being between 400 and 600 microns.

10. The article of claim 7, the diameter of the opposite container ends each between 500 and 3000 microns.

11. The article of claim 10, the diamter of the opposite container ends each being between 750 and 2000 microns.

12. The article of claim 1, an inner surface of the container being coated with a release agent or being made of an inherently releasable material.

13. The article of claim 1, an inner surface of the container being coated with a release agent or being made of an inherently releasable material.

14. The article of claim 1, the opposite container ends being larger in size than an outside diameter of buffers of the first and second fibers.

15. The article of claim 1, the central region containing only the adhesive therewithin prior to receiving the ends of the fibers to be aligned.

16. An apparatus for joining ends of two optical fibers, comprising:
a generally tubular container;
a curable liquid adhesive disposed within the container and around first and second optical fibers and between ends thereof, a central region diameter of the container in a vicinity of the fiber ends being substantially larger than diameters of the fiber ends;
an inner surface of the container being coated with a release agent or being made of an inherently releasing material such that upon curing of the adhesive and shrinkage thereof caused thereby the adhesive will tend to separate from the inner surface of the container, the container having a substantially cylindrical shape and being substantially hour-glass like in cross-section.

17. The apparatus of claim 16, the inner surface of the container being coated with a release agent.

18. The apparatus of claim 16, the inner surface of the container being made of an inherently releasing material.

19. The apparatus of claim 16, the container being made of glass.

20. The apparatus of claim 17, the release agent comprising a fluoropolymer.

21. The apparatus of claim 17, the release agent comprising a silicon oil.

22. The apparatus of claim 17, the release agent comprising a silicon oil and a cured silicon.

23. The apparatus of claim 18, the material comprising a polymer.

24. The apparatus of claim 23, the polymer comprising poly(4-methyl pentene-1).

25. The apparatus of claim 23, the polymer comprising a fluoropolymer.

26. The apparatus of claim 16, a central region of the container having a diameter smaller than a diameter of opposite ends of the container, the central region diameter being substantially larger than a diameter of claddings of first and second ends of the first and second fibers to be joined so as to allow the first and second fiber ends to be moved within the container relative to one another in amounts sufficient such that cores of the first and second fibers can be optimally aligned, the central region diameter being more than 1.2 times as large as a cladding diameter of each of the first and second fiber ends, the central region containing only the adhesive therewithin prior to receiving the ends of the fibers to be aligned.

* * * * *